United States Patent
Cheng

(10) Patent No.: US 7,471,775 B2
(45) Date of Patent: Dec. 30, 2008

(54) METHOD AND APPARATUS FOR GENERATING AND UPDATING A VOICE TAG

(75) Inventor: Yan Ming Cheng, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 702 days.

(21) Appl. No.: 11/170,892

(22) Filed: Jun. 30, 2005

(65) Prior Publication Data

US 2007/0019793 A1    Jan. 25, 2007

(51) Int. Cl.
    *H04M 1/64* (2006.01)
(52) U.S. Cl. ............... 379/88.01; 455/563; 704/247; 704/270.1
(58) Field of Classification Search ............... 379/88.01; 704/240, 249, 251, 270.1, 247; 455/563
    See application file for complete search history.

(56) References Cited

U.S. PATENT DOCUMENTS

| | | | |
|---|---|---|---|
| 5,333,275 A | 7/1994 | Wheatley et al. | |
| 6,134,527 A | 10/2000 | Meunier et al. | |
| 6,226,612 B1 | 5/2001 | Srenger et al. | |
| 6,519,562 B1 * | 2/2003 | Phillips et al. | ............... 704/240 |
| 6,606,597 B1 | 8/2003 | Ringger et al. | |
| 6,615,172 B1 | 9/2003 | Bennett et al. | |
| 6,973,427 B2 * | 12/2005 | Hwang et al. | ............... 704/249 |
| 7,010,484 B2 * | 3/2006 | Lin | ............... 704/240 |
| 7,191,135 B2 * | 3/2007 | O'Hagan | ............... 704/270.1 |
| 2002/0110226 A1 | 8/2002 | Kovales et al. | |
| 2004/0006461 A1 | 1/2004 | Gupta et al. | |
| 2005/0114131 A1 | 5/2005 | Stoimenov et al. | |
| 2006/0215821 A1 * | 9/2006 | Rokusek et al. | ............... 379/88.01 |

OTHER PUBLICATIONS

Holter et al., "Speech Communication: Maximum Likelihood Modeling of Pronunciation Variation," Speech Communication 29, Department of Signal Processing and System Design, SINTEF Telecom and Infomatics, Norway 1999, pp. 177-191.

* cited by examiner

*Primary Examiner*—Gerald Gauthier

(57) ABSTRACT

A method and apparatus (100) for updating a voice tag comprising N stored voice tag phoneme sequences includes a function (110) for determining (205) an accepted stored voice tag phoneme sequence for an utterance, a function (140) for extracting(210) a current set of M phoneme sequences having highest likelihoods of representing the utterance, a function (160) for updating (215) a reference histogram associated with the accepted voice tag, and a function (160) for updating (225) the voice tag with N selected phoneme sequences that are selected from the current set of M phoneme sequences and the set of N voice tag phoneme sequences, wherein the N selected phoneme sequences have phoneme histograms most closely matching the reference histogram. The method and apparatus (100) also generates a voice tag using some functions (110, 140, 160) that are common with the method and apparatus to update the voice tag, such as the extracting (410) of the current set of M phoneme sequences.

11 Claims, 4 Drawing Sheets

METHOD AND APPARATUS FOR GENERATING AND UPDATING A VOICE TAG

RELATED APPLICATION

This application is related to U.S. application Ser. No. 11/155,944, entitled "Method and Apparatus for Generating a Voice Tag", filed on Jun. 17, 2005 and assigned to the assignee hereof.

FIELD OF THE INVENTION

The present invention relates generally to speech dialog systems and more particularly to speech directed information look-up.

BACKGROUND

Methods of information retrieval and electronic device control based on an utterance of a word, a phrase, or the making of other unique sounds by a user have been available for a number of years. In handheld telephones and other handheld electronic devices, an ability to retrieve a stored information, such as a telephone number, a contact info, etc., using words, phrases, or other unique sounds (hereafter generically referred to as utterances) is very desirable in certain circumstances, such as while the user is walking or driving. As a result of the increase in computing power of handheld devices over the last several years, various methods have been developed and incorporated into handheld telephones to use an utterance to provide the retrieval of stored information.

One class of techniques for retrieving phone numbers that has been developed is a class of retrieval that uses voice tag technology. One well known speaker dependent voice tag retrieval technique that uses dynamic time warping (DTW) has been successfully implemented in a network server due to its large storage requirement. In this technique, a set of a user's reference utterances are stored, each reference utterance being stored as a series of spectral values in association with a different stored telephone number. These reference utterances are known as voice tags. When an utterance is thereafter received by the network server that is identified to the network server as being intended for the retrieval of a stored telephone number (this utterance is hereafter called a retrieval utterance), the retrieval utterance is also rendered into a series of spectral values and compared to the set of voice tags using the DTW technique, and the voice tag that compares most closely to the retrieval utterance determines which stored telephone number may be retrieved. This method is called a speaker dependent method because the voice tags are rendered by one user. This method has proven useful, but limits the number of voice tags that can be stored due to the size of each series of spectral values that represents a voice tag. The reliability of this technique has been acceptable to some users, but higher reliability would be more desirable.

Another well known speaker dependent voice tag retrieval technique also stores voice tags in association with telephone numbers, but the stored voice tags are more compactly stored in a form of Hidden Markov Model (HMM). Since this technique requires significantly less storage space, it has been successfully implemented in a handhold device, such as mobile telephone. Retrieval utterances are compared to a hidden Markov model (HMM) of the feature vectors of the voice tags. This technique generally requires more computing power, since the HMM model is generated within the handheld telephone (generating the user dependent HMM in the fixed network would typically require too much data transfer).

BRIEF DESCRIPTION OF THE FIGURES

The accompanying figures, where like reference numerals refer to identical or functionally similar elements throughout the separate views, and which together with the detailed description below, are incorporated in and form part of the specification, serve to further illustrate the embodiments and explain various principles and advantages, in accordance with the present invention.

Figure 1:
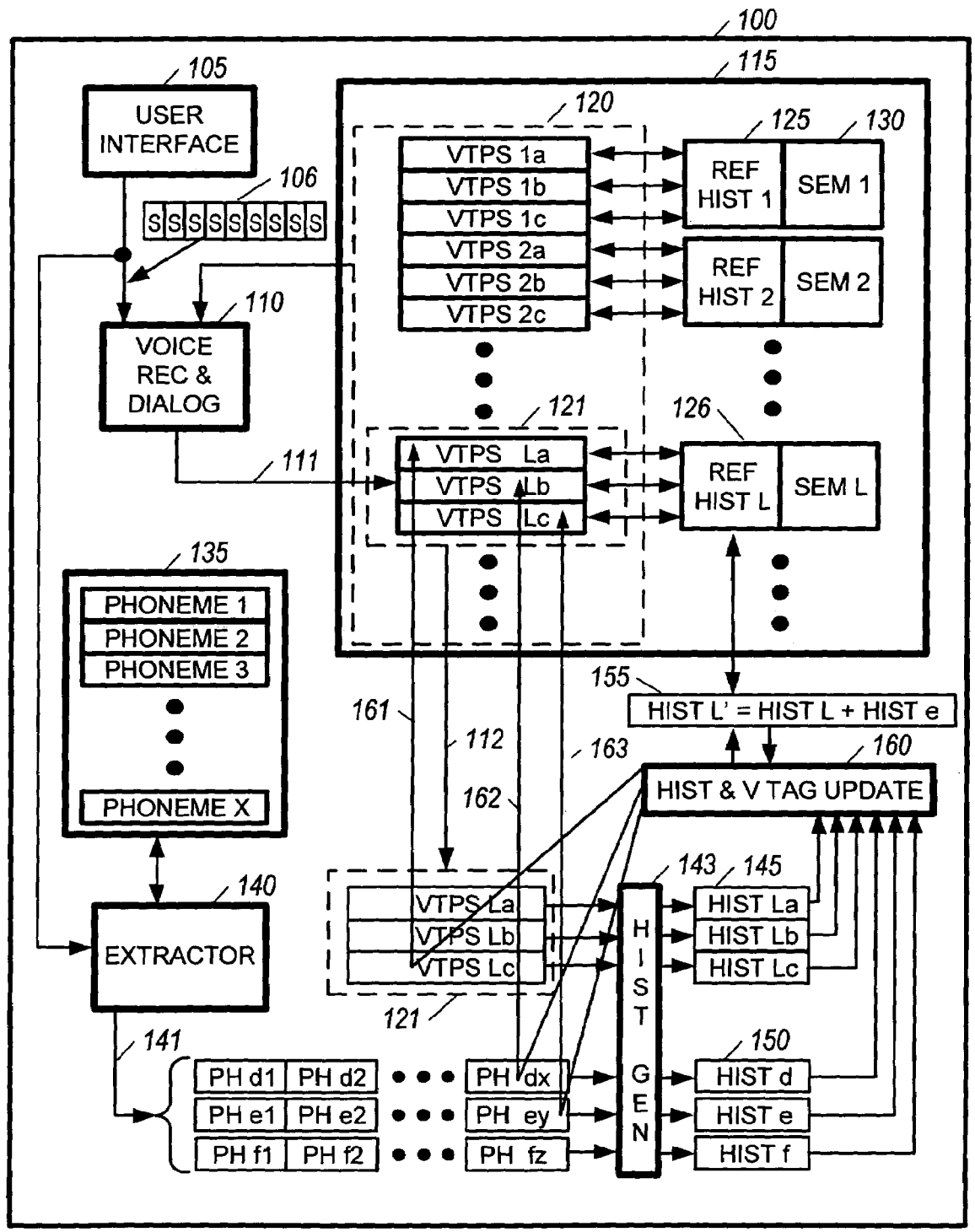
FIG. 1 is a block diagram that shows an example of an electronic device that uses voice tags, in accordance with some embodiments of the present invention for which a voice tag is accepted.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to speech dialog aspects of electronic devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
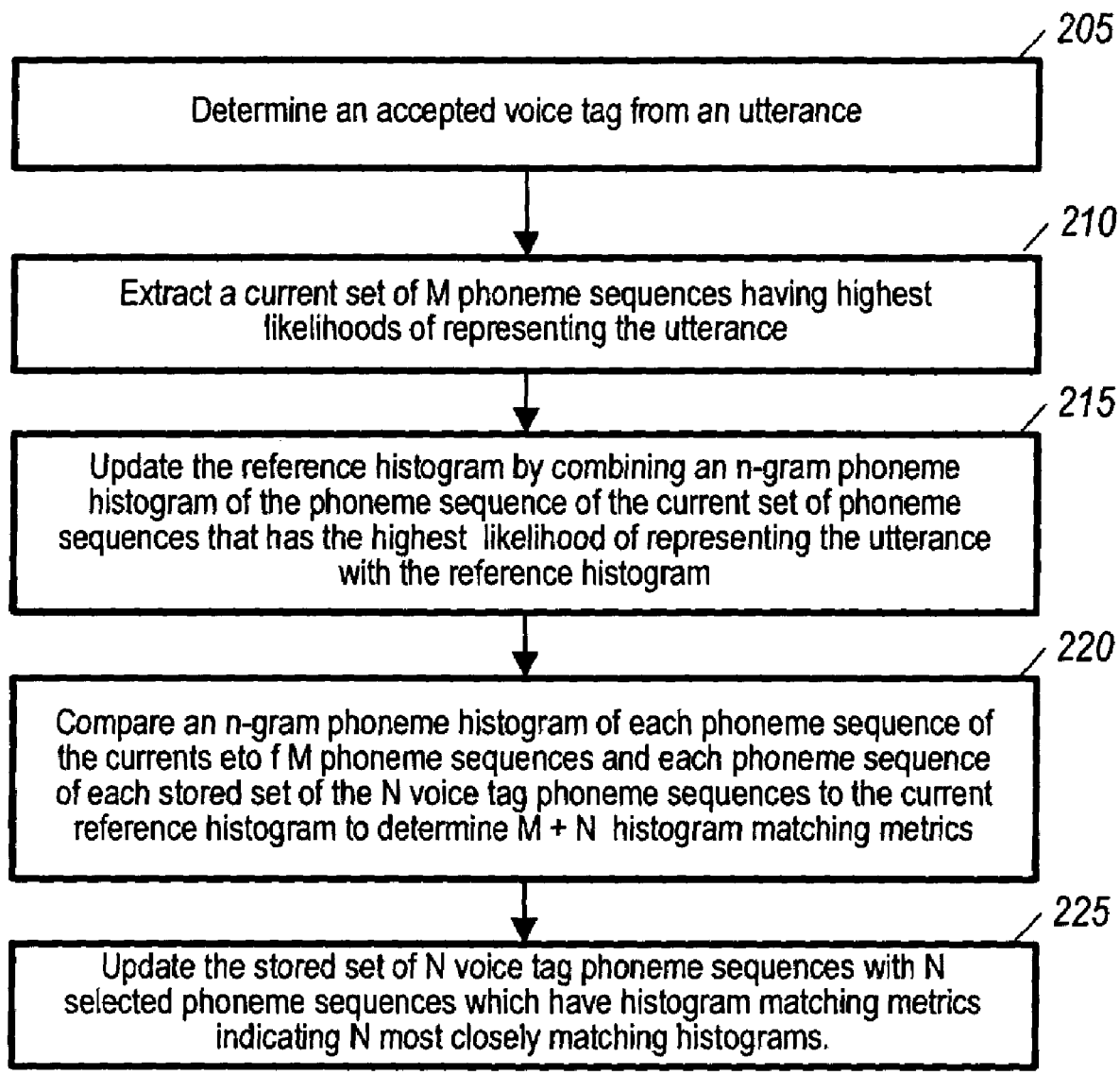
FIG. 2 is a flow chart that shows some steps of methods used to update and use voice tags, in accordance with some embodiments of the present invention for which a voice tag is accepted.

Referring to FIG. 1, a block diagram shows an example of an electronic device 100 that uses voice tags, in accordance with some embodiments of the present invention. Referring also to FIG. 2, a flow chart show some steps of methods used to update and use voice tags, in accordance with some embodiments of the invention. The electronic device 100 (FIG. 1) comprises a user interface 105, a voice recognition and dialog function 110, a voice tag lookup table 115, a stored set of language phonemes 135, an extractor 140, a histogram generator 143 and a histogram and voice tag update function 160. Information and information flow are shown in FIGS. 1 and 2 that are for an example in which an utterance yields an accepted voice tag The user interface 105 processes utterances made by a user, converting a sound signal that forms each utterance into frames of equal duration and then analyzing each frame to generate a set of values that represents each frame, such as a vector that results from a spectral analysis of each frame. Each utterance is then represented by the sequence of vectors for the analyzed frames. In some embodiments the spectral analysis is a fast Fourier transform (FFT), which requires relatively simple computation. An alternative technique may be used, such as a cepstral analysis. The utterances, represented by the analyzed frames are coupled by the user interface 105 to the voice recognition and dialog function 110 and to the extractor 140. In the example shown in FIG. 1, an exemplary utterance is represented by a sequence of spectral values 106. It will be appreciated that when the frames are, for example, 10 milliseconds in duration, the number of frames in a typical utterance will typically be many more than illustrated by the sequence in FIG. 1.

The voice tag lookup table 115 comprises a set of P voice tags 120, each voice tag comprising N voice tag phoneme sequences. In the example shown in FIG. 1, N is three, and a voice tag 121 identified as set L comprises voice tag phoneme sequences (VTPS's) La, Lb, and Lc. Each voice tag is associated with one semantic and one reference histogram. Thus there are P reference histograms 125 and P semantics 130. The electronic device 100 has previously interacted with the user through one or more user interfaces (not shown in FIG. 1), such as a keyboard, microphone, and display, to determine semantic values that the user chooses to associate with the voice tags previously listed in the voice tag lookup table 115. The semantic values may be telephone numbers, pictures, and addresses, or any other information (verbal, written, visual, etc.) that the electronic device 100 can store and that the user may want to recall using a voice tag.

An utterance coupled to the voice recognition and dialog function 110 is used by the voice recognition and dialog function 110 to select from the voice tag lookup table 115 a voice tag phoneme sequence that has characteristics that most closely match the utterance, which may be accomplished using conventional techniques. This selection is identified by the output 111, which identifies voice tag L 121 as the voice tag having the voice tag phoneme sequence (VTPS) Lb with the closest match. After further interaction with the user, the electronic device 100 determines whether the voice tag is accepted. There are many ways the voice tag could be determined to be an accepted voice tag. A typical method is that the semantic associated with the voice tag is presented to the user and the user verifies that the semantic is the one intended to be identified by the utterance. (For example, the voice tag may be the text form of a name that is uttered.) In another example, the voice tag is used to synthesize the utterances and the user verifies the utterance, thereby verifying the voice tag. These techniques are just two examples of determining an accepted voice tag from an utterance, which is illustrated by step 205 (FIG. 2). The electronic device 100 may discard the input utterance when a determination is made that no acceptable voice tag has been found. Otherwise, the electronic device 100 may use the unaccepted utterance to generate a new voice tag, or a new voice tag may be generated for other reasons. The generation of a new voice tag is described in more detail below with reference to FIGS. 3 and 4.

As noted above, the utterance 106 is also coupled to the extractor 140. Also coupled to the extractor 140 is the stored set of language phonemes 135, which is typically a set of speaker independent phoneme models, and the set is typically for one particular language (e.g., American English). Each phoneme in the set of phonemes may be stored in the form of sequences of values that are of the same type as the values used for the utterance 106. For the example of FIG. 1, the phonemes of these embodiments may be stored as spectral values. In some embodiments, the types of values used for the phonemes and the combined utterance may differ, such as using characteristic acoustic vectors for the phonemes and spectral vectors for the utterances. When the types of values are different, the extractor 140 may convert one type to be the same as the other. The extractor 140 uses a speech recognition related technique with a phoneme loop grammar (i.e., any phoneme is allowed to be followed any other phoneme). The speech recognition related technique may use a conventional speech recognition process, and may be based on a hidden Markov model. In some embodiments of the present invention, an M-best search strategy may be used at step 210 of FIG. 2 to yield up to M alternative phonemic strings that best represent the utterance 106 (i.e., that have the highest M likelihoods of correctly representing the combined utterance 106). This is called the current set of M phoneme sequences. The values N and M may be the same. In the example illustrated in FIG. 1, they are both equal to three. A set of phonotactic rules may also be applied by the extractor 140 as a statistical language model to improve the performance of the speech recognition related process. In the example of FIG. 1, the current set of three phoneme sequences 141 are shown as being generated as phoneme sequences d, e, and f, having respective phoneme lengths of x, y, and z. The lengths x, y, and z need not be the same value, but may be. The extractor 140 also generates a likelihood value for each phoneme sequence that represents how likely the current phoneme sequence represents the utterance 106.

The histogram generating function 143 then generates for each phoneme sequence of the current set of M phoneme sequences 141 and for each phoneme sequence in the stored set of N voice tag phoneme sequences of the voice tag L an n-gram histogram, shown in FIG. 1 as histograms La, Lb, and Lc 145, and histograms d, e, and f 150. These histograms 145 may be histogram analyses of each current phoneme sequence that are based on mono-gram, bi-gram, or other length phoneme sub-sequences. In one embodiment, bi-gram phoneme sub-sequences are used. The analysis in some embodiments may generate a normalized frequency distribution of the n-grams; others may use an absolute count of the n-grams or other techniques. The histogram and voice tag update function 160 then uses the histograms of the current set of phoneme sequences 141 to generate an n-gram updating phoneme histogram and combines it with the reference histogram 126 that was associated with the accepted voice tag, and updates the reference histogram by storing the combined result 155 as a new value of the reference histogram 126, represented by step 215 in FIG. 2. In some embodiments, the histogram and voice tag update function 160 compares the likelihood values of the phoneme sequences of the current set of phoneme sequences 141, and determines which has the highest likelihood of representing the utterance, and uses the n-gram histogram associated with it as updating phoneme histogram to combine with the reference histogram, and stores the combined result 155 as a new value of the reference histogram 126. The combining in some embodiments may be done in a weighted manner, giving the n-gram occurrence values in the reference histogram associated with the accepted voice tag more or less weight than the occurrence values in the selected histogram. In the example shown in FIG. 1, the reference histogram L 126 is updated by histogram e in the set of histograms 150, thereby generating reference histogram L' 155, which is used to replace (update) the reference histogram L 126. This completes the histogram update portion of the functions performed by the histogram and voice tag update function 160.

The histogram and voice tag update function 160 then compares the n-gram phoneme histogram of each of the M phoneme sequences of the current set of phoneme sequences (150 in FIG. 1) and of each of the stored set of N voice tag phoneme sequences (145 in FIG. 1) to the current reference histogram to determine M+N histogram matching metrics. Each matching metric may be, for instance, a sum of absolute differences of the normalized probabilities of respective n-gram values in each pair of histograms that are compared. Other comparison techniques may also work well. Just on example is using the sum of the square roots of differences of the normalized probabilities of respective n-gram values in each pair of histograms. This is represented as step 220 in FIG. 2. As a next step in this technique, the histogram and voice tag update function 160 replaces the stored N phoneme sequences of the voice-tag at step 225 (FIG. 2) with the N phoneme sequences which have histogram matching metrics indicating the N closest matches, which are called the N selected phoneme sequences. Alternatively, the histogram and voice tag update function 160 may update the stored N phoneme sequences of the voice-tag at step 225 (FIG. 2) with the N selected phoneme sequences which have histogram matching metrics indicating the N closest matches by replacing only those voice tag phoneme sequences that have changes. In the example shown in FIG. 1, histogram matching metrics for the voice tag phoneme sequence Lc, current phoneme sequence d, and current phoneme sequence e indicate the three closest matches, and are selected by the histogram and voice tag update function to replace or update the previous set of voice tag phoneme sequences 121 that are phoneme sequences La, Lb, and Lc of the voice tag L. This completes the voice tag update portion of the functions performed by the histogram and voice tag update function 160.

Figure 3:
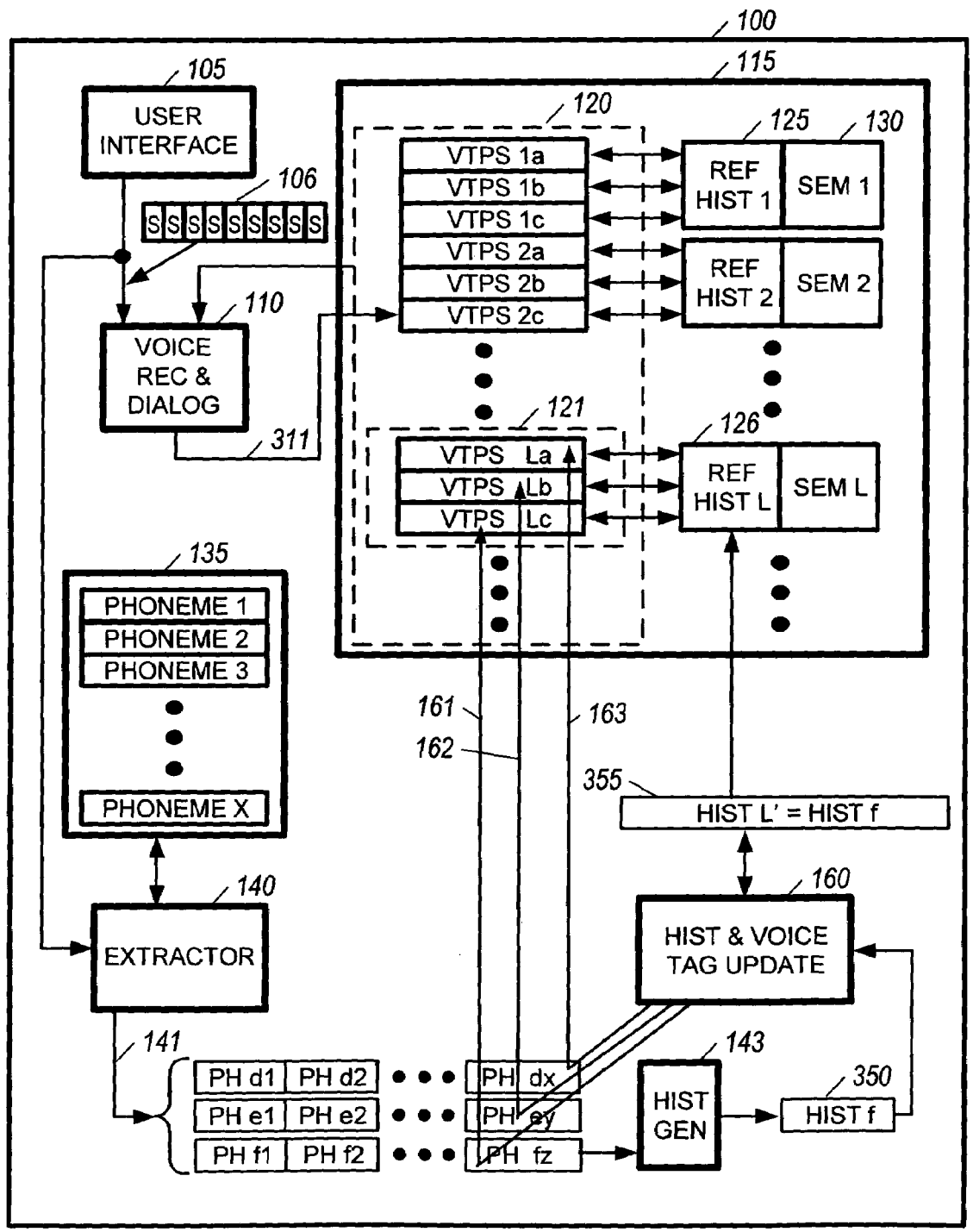
FIG. 3 is a block diagram that shows an example of an electronic device that uses voice tags, in accordance with some embodiments of the present invention for which a voice tag is not accepted.
Figure 4:
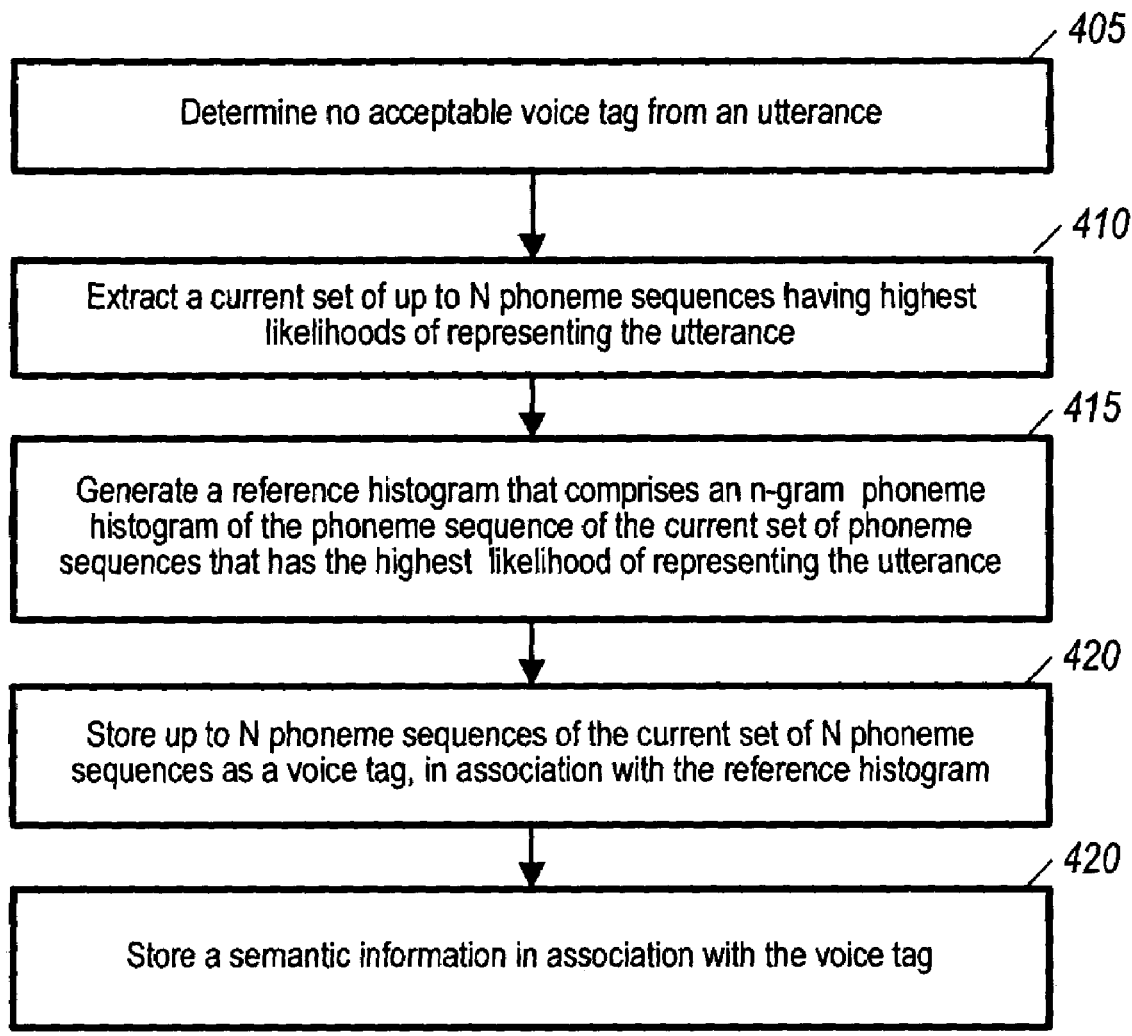
FIG. 4 is a flow chart that shows some steps of methods used to generate and use voice tags, in accordance with some embodiments of the present invention for which a voice tag is not accepted.

Referring to FIG. 3, a block diagram shows an example of the electronic device 100 that uses voice tags, in accordance with some embodiments of the present invention. Referring also to FIG. 4, a flow chart show some steps of methods used to generate and use voice tags, in accordance with some embodiments of the invention. The electronic device 100 (FIG. 1) comprises the user interface 105, the voice recognition and dialog function 110, the voice tag lookup table 115, the stored set of language phonemes 135, the extractor 140, the histogram generator 143, and the histogram and voice tag update function 160 described above with reference to FIG. 1. Information and information flow are shown in FIGS. 3 and 4 that are for an example in which an utterance yields a voice tag that is not accepted.

The utterance 106 (FIG. 3) is analyzed by the voice recognition and dialog function 110, which may select a closest matching voice tag 311 in the voice tag lookup table 115, such as voice tag 2c. However, in these embodiments the voice recognition and dialog function 110 then determines that this is not an acceptable voice tag for the utterance, for example as a result of a user non-confirmation of the semantic associated with the voice tag. The voice recognition and dialog function 110 may further determine a second best voice tag, such as voice tag J (not shown in FIG. 1), which may also be determined not to be an acceptable voice tag. This process may be repeated, but when at the end of the process, no voice tag is accepted, the voice recognition and dialog function 110 determines that there is no acceptable voice tag from the utterance, which is shown as step 405 (FIG. 4). When this occurs, the voice recognition and dialog function 110 determines either that the input utterance is not acceptable or that the input utterance is for a new voice-tag.

In the case of the not acceptable input utterance, the input utterance is simply discarded and the extractor 140 performs no operation. In the case that the input utterance is for a new voice tag, the extractor 140 extracts a current set of phoneme sequences 141 having the highest likelihoods of representing the utterance. The current set of phoneme sequences may be of a quantity N or may be another quantity as small as one. Since there are no phoneme sequences for the new voice tag, the reference histogram of the new voice tag is null or non-existent. The histogram generator function 143 generates an n-gram phoneme histogram 350 of the phoneme sequence of the current set of phoneme sequences that has the highest likelihood of representing the utterance (in this example, histogram f), and the histogram and voice tag update function 160 stores it as a new value 355 of the reference histogram 126 for a not yet stored set of phoneme sequences of the new voice tag (represented by voice tag 121 in FIG. 3) at step 415 of FIG. 4. The histogram and voice tag update function 160 then stores, at step 420 (FIG. 4) up to N phoneme sequences of the current set of N phoneme sequences as a voice tag, in association with the reference histogram. In the example in FIG. 3, the histogram and voice tag update function 160 stores the three phoneme sequences of the current set of three phoneme sequences as the voice tag phoneme sequence of the voice tag L 121, phoneme sequences La, Lb, and Lc. The phoneme sequences of the current set of N phoneme sequences selected for storing are those that are indicated by the likelihood values to be most likely to match the utterance.

In some embodiments, the actions described with reference to step 205 of FIG. 2 and step 405 of FIG. 4 may be considered as three branches of a decision process executed by the electronic device 100 in which a voice tag is either accepted as an existing voice-tag, not accepted as any existing voice tag or accepted as a new voice tag for an utterance. It will be appreciated that the techniques described with reference to FIGS. 3 and 4 may be initiated in response to an action other than the non-acceptance of a voice tag. For example, an utterance may be used to generate a new voice tag in response to a training process or a database creation process. In these situations there may not be an unaccepted selection of a voice tag. Thus it can be appreciated that in the situations where a new voice tag is generated, the process is initiated by a command of some sort.

An embodiment according to the present invention was tested that used the above described sequential technique with three training utterances: a first utterance as an unaccepted voice tag and two more utterances as accepted voice tags, and the embodiment further used a grammar of phoneme loop to store the phoneme model of the utterance. With this embodiment, a database of 85 voice tags and semantics comprising names was generated and tested with 684 utterances from mostly differing speakers. The name recognition accuracy was 95.18%. When the voice tags for the same 85 names were generated manually by phonetic experts, the name recognition accuracy was 92.69%. The embodiments according to the present invention have an advantage over conventional systems in that voice tags related to a first language can, in many instances, be successfully generated using a set of phonemes of a second language, and still produce good accuracy.

It will be appreciated that embodiments of the invention described herein may comprise one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

That which is claimed is:

1. A method used to update a voice tag, the method comprising:
   determining an accepted stored voice tag from an utterance, wherein the accepted stored voice tag comprises a stored set of N voice tag phoneme sequences that are associated with a semantic and a reference phoneme histogram;
   extracting a current set of M phoneme sequences having highest likelihoods of representing the utterance, using a stored set of language phonemes;
   updating the reference phoneme histogram by using an updating phoneme histogram derived from the current set of M phoneme sequences; and
   updating the voice tag with N selected phoneme sequences that are selected from the current set of M phoneme sequences and the stored set of N voice tag phoneme sequences, wherein the N selected phoneme sequences have associated phoneme histograms most closely matching the reference phoneme histogram, and wherein the updating of the voice tag is performed after the updating of the reference phoneme histogram.

2. The method according to claim 1, wherein the updating of the reference phoneme histogram further comprises generating the updating phoneme histogram as an n-gram histogram from a phoneme sequence of the current set of phoneme sequences that has a highest likelihood of representing the utterance.

3. The method according to claim 1 further comprising:
   comparing an n-gram phoneme histogram of each phoneme sequence of the current set of M phoneme sequences and of each phoneme sequence of the stored set of N voice tag phoneme sequences to the reference phoneme histogram to determine M+N histogram matching metrics.

4. The method according to claim 1, wherein the stored set of language phonemes is for a particular language.

5. The method according to claim 1, wherein the stored set of language phonemes is a set of speaker independent phonemes.

6. The method according to claim 1, further comprising storing the voice tag in association with a semantic value.

7. The method according to claim 1, wherein the extracting of the current set of M phoneme sequences comprises using a hidden Markov model.

8. A method used to generate a voice tag, the method comprising:
   determining a command to generate a voice tag from an utterance;
   extracting a current set of phoneme sequences having highest likelihoods of representing the utterance, using a set of stored language phonemes;
   generating a reference phoneme histogram that comprises an n-gram phoneme histogram of the phoneme sequence of the current set of phoneme sequences that has a highest likelihood of representing the utterance; and
   storing up to N phoneme sequences selected from the current set of phoneme sequences as a voice tag, in association with the reference phoneme histogram.

9. The method according to claim 8, further comprising:
   determining no existence of an acceptable stored voice tag phoneme sequence for the utterance before determining the command to generate a voice tag from the utterance.

10. The method according to claim 8 further comprising:
    storing semantic information in association with the voice tag.

11. An electronic device comprising:
    means for determining an accepted voice tag phoneme sequence from an utterance, wherein the accepted voice tag phoneme sequence is in a stored set of N voice tag phoneme sequences that form a voice tag that is associated with a semantic and a reference phoneme histogram;
    means for extracting a current set of M phoneme sequences having highest likelihoods of representing the utterance, using a stored set of language phonemes;
    means for updating the reference phoneme histogram that uses an updating phoneme histogram derived from the current set of M phoneme sequences; and
    means for updating the voice tag with N selected phoneme sequences that are selected from the current set of M phoneme sequences and the stored set of N voice tag phoneme sequences, wherein the N selected phoneme sequences have associated phoneme histograms most closely matching the reference phoneme histogram.

* * * * *